(12) United States Patent
Hanada

(10) Patent No.: US 6,311,562 B1
(45) Date of Patent: Nov. 6, 2001

(54) HUMAN LUMBAR MODEL STRUCTURE CAPABLE OF SIMULATING PRESSURE APPLIED TO NUCLEUS PULPOSUS IN HUMAN LUMBAR AND APPLICATION EQUIPMENT UTILIZING THE STRUCTURE

(76) Inventor: Keiichi Hanada, 3-51-2-3-407, Kojima-cho, Chofu-shi, Tokyo (JP)

( * ) Notice: Subject to any disclaimer, the term of this patent is extended or adjusted under 35 U.S.C. 154(b) by 0 days.

(21) Appl. No.: 09/517,657

(22) Filed: Mar. 3, 2000

(30) Foreign Application Priority Data

Sep. 2, 1999 (JP) .................................................. 11-248275

(51) Int. Cl.⁷ ......................................................... G01L 7/00
(52) U.S. Cl. ............................................................... 73/714
(58) Field of Search ........................ 73/714, 756; 623/17, 623/18, 20; 606/53, 60, 61, 69, 70, 71; 364/474.03, 474.02, 474.37, 413.13, 413.28, 413.02, 413.01, 413.19

(56) References Cited

U.S. PATENT DOCUMENTS

| | | | |
|---|---|---|---|
| 5,771,181 | * 6/1998 | Moore | 364/578 |
| 5,827,328 | * 10/1998 | Butterman | 623/17 |
| 6,039,763 | * 3/2000 | Shelokov | 623/17 |

* cited by examiner

*Primary Examiner*—William Oen
(74) *Attorney, Agent, or Firm*—Collard & Roe, P.C.

(57) ABSTRACT

The human lumbar model structure comprises a lumbar assembly and an abdominal/back muscle member. The lumbar assembly comprises an upper body member, an upper lumbar member, an annulus fibrosus member, a lower lumbar member, and a lower body member which are coaxially arranged around a common center axis and which are superposed vertically from top to bottom in this order. The abdominal/back muscle member is made of an elastic material and has a hollow cylindrical shape. The abdominal/back muscle member surrounds and elastically tightens the lumbar assembly over a center area around the annulus fibrosus member. The annulus fibrosus member comprises a thick cylindrical ring made of a hard elastic material and is tightly fitted into the upper and lower lumbar members with its inner cavity filled with a fluid as a nucleus pulposus member. A pressure sensor is arranged along the center axis of the lower lumbar member in direct contact with the nucleus pulposus member. The pressure sensor detects a pressure variation of the nucleus pulposus member as a voltage variation in response to the inclination or the displacement of the two lumbar members and produces an electric signal representative of the voltage variation.

7 Claims, 9 Drawing Sheets

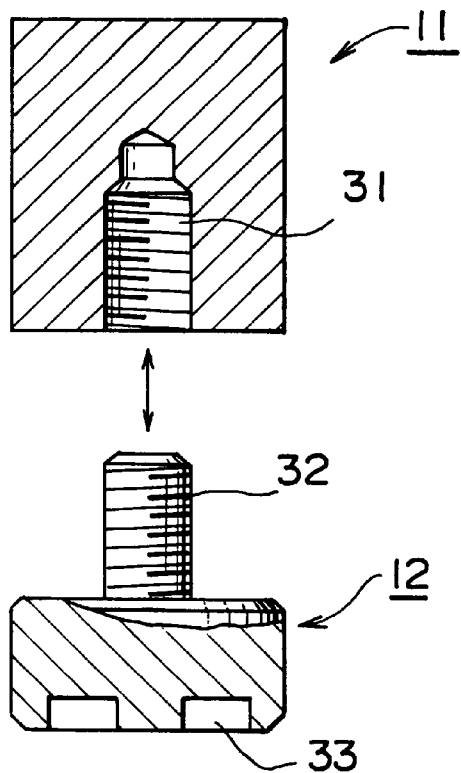
FIG. 2
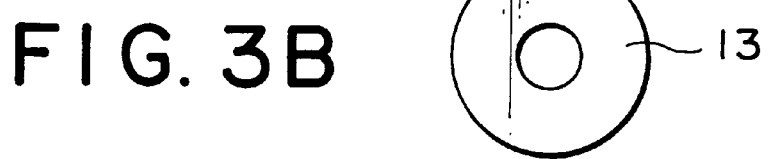

HUMAN LUMBAR MODEL STRUCTURE CAPABLE OF SIMULATING PRESSURE APPLIED TO NUCLEUS PULPOSUS IN HUMAN LUMBAR AND APPLICATION EQUIPMENT UTILIZING THE STRUCTURE

BACKGROUND OF THE INVENTION

This invention relates to a human lumbar model structure for simulating a pressure applied to nucleus pulposus in a human lumbar and an application equipment utilizing the structure. More particularly, this invention relates to a human lumbar model structure capable of objectively and quantitatively estimating and evaluating a ride vibration comfort which would be felt by a human being (an occupant, a driver, a passenger, etc.) on a vehicle such as a motor vehicle, a train, a vessel, and a spacecraft travelling with vibration, variation in speed, and/or change of acceleration.

Motor vehicles are typical vehicles which have widely spread in recent years and are continuously and infinitely developing in the modern society. As a consequence, different types of motor vehicles have been used in various uses, respectively. There are various models or classes in motor vehicles of one type of use (for example, passenger cars). On the other hand, many people have came to pay attention to safety and the ride vibration comfort of vehicles upon purchasing their vehicles.

For safety, motor vehicles for each of types of uses have been ranked through various kinds of collision or crash tests, the analysis of damages in those motor vehicles involved in accidents, and so on. On the other hand, evaluation of motor vehicles in the above-mentioned ride vibration comfort relies upon sensory tests in which test results widely fluctuate among individuals. Thus, no basis for objective or quantitative evaluation has been established yet.

Long-distance or long-time drivers often suffer from herniation of a lumbar intervertebral disk. According to one of the most convincing theories accepted by many orthopedists, the occurrence and the aggravation of the above-mentioned hernia are correlated with ride vibration comfort when travelling in motor vehicles.

In view of the above, it is required to realize a human lumbar model structure and application equipment utilizing the structure in order to objectively and quantitatively evaluate ride vibration comfort.

SUMMARY OF THE INVENTION

It is therefore the object of the present invention to provide a human lumbar model structure which enables objective and quantitative evaluation of ride vibration comfort of a vehicle, and application equipment utilizing the structure.

This invention provides a human lumbar model structure for simulating pressure applied to the nucleus pulposus in the lumbar spine of a human body, which comprises a cylindrical lumbar assembly and an abdominal/back muscle member.

The lumbar assembly comprises an upper body member, an upper lumbar member, an annulus fibrosus member, a lower lumbar member, and a lower body member which are coaxially arranged around a common center axis and which are vertically superposed from top to bottom in this order. The abdominal/back muscle member is made of an elastic material and has a hollow cylindrical shape. The abdominal/back muscle member surrounds and tightens the lumbar assembly over at least a center area thereof extending from the midlevel of the upper body member to the midlevel of the lower body member.

The upper and lower lumbar members are tightly fitted into the upper and lower body members, respectively. The annulus fibrosus member comprises a thick cylindrical ring made of a hard elastic material. The annulus fibrosus member has upper and lower portions fitted into the upper and the lower lumbar members, respectively, and an inner cavity filled with a fluid as a nucleus pulposus member.

The above-mentioned structure can provide a human lumbar model having the nucleus pulposus member as an artificial nucleus pulposus which satisfies mechanical and functional conditions substantially equivalent to those of the actual nucleus pulposus existing between lumbar vertebrae of a human being. The model has been confirmed to have the characteristic that the fluid as the nucleus pulposus member is moved, in response to vibration applied thereto, with pressure variation thereof, its peak value has a correlation with a vibration sensory feeling of an individual who suffers from herniation of an intervertebral disk.

In one specific embodiment of the human lumbar model structure, the annulus fibrosus member is made of graphite-containing natural rubber having a rubber hardness approximately equal to 60 degrees and is produced by a drawing process to have an outer diameter of about 24 mm, an inner diameter of about 9 mm and a length of about 20 mm. The nucleus pulposus member as the artificial nucleus pulposus may be silicone grease. The abdominal/back muscle member of the hollow cylindrical shape comprises a layered structure of two natural rubber sheets each of which is about 5 mm thick and has an outer diameter of about 120 mm, an inner diameter of about 100 mm, and a length of about 210 mm.

The human lumbar model structure can comprise a pressure sensor arranged along a center axis of the lower lumbar member in direct contact with the nucleus pulposus member for detecting pressure variation of the nucleus pulposus member as a voltage variation linearly proportional to the pressure variation to produce an electric signal representative of the voltage variation.

This invention also provides an application equipment utilizing the above-mentioned human lumbar model structure to simulate pressure applied to the nucleus pulposus in the lumbar spine of a human body. The application equipment comprises a human robot including the human lumbar model structure securely mounted on the upper surface of a base, and a loading member arranged on the human lumbar model structure so that the human robot has a weight equivalent to that of the human body, and a recording unit connected to the pressure sensor for time-sequentially recording pressure variations detected by the pressure sensor, so that the vibrations applied to the human robot are recorded as a waveform representing the pressure variations occurring in the nucleus pulposus member.

The human robot can be securely mounted on the upper surface of the base with its center axis coincident with the gravitational direction or the inclination of the back of a passenger's seat.

BRIEF DESCRIPTION OF THE DRAWINGS

FIG. 2 is an exploded vertical sectional view of the upper lumbar member illustrated in FIG. 1;

FIG. 3A is a vertical sectional view of the annulus fibrosus member illustrated in FIG. 1;

FIG. 3B is a plan view of the annulus fibrosus member in FIG. 3A;

DESCRIPTION OF THE PREFERRED EMBODIMENTS

The human lumbar model structure and an application device according to the preferred embodiments of this invention will be described in detail with reference to the drawings attached here to.

Figure 1:
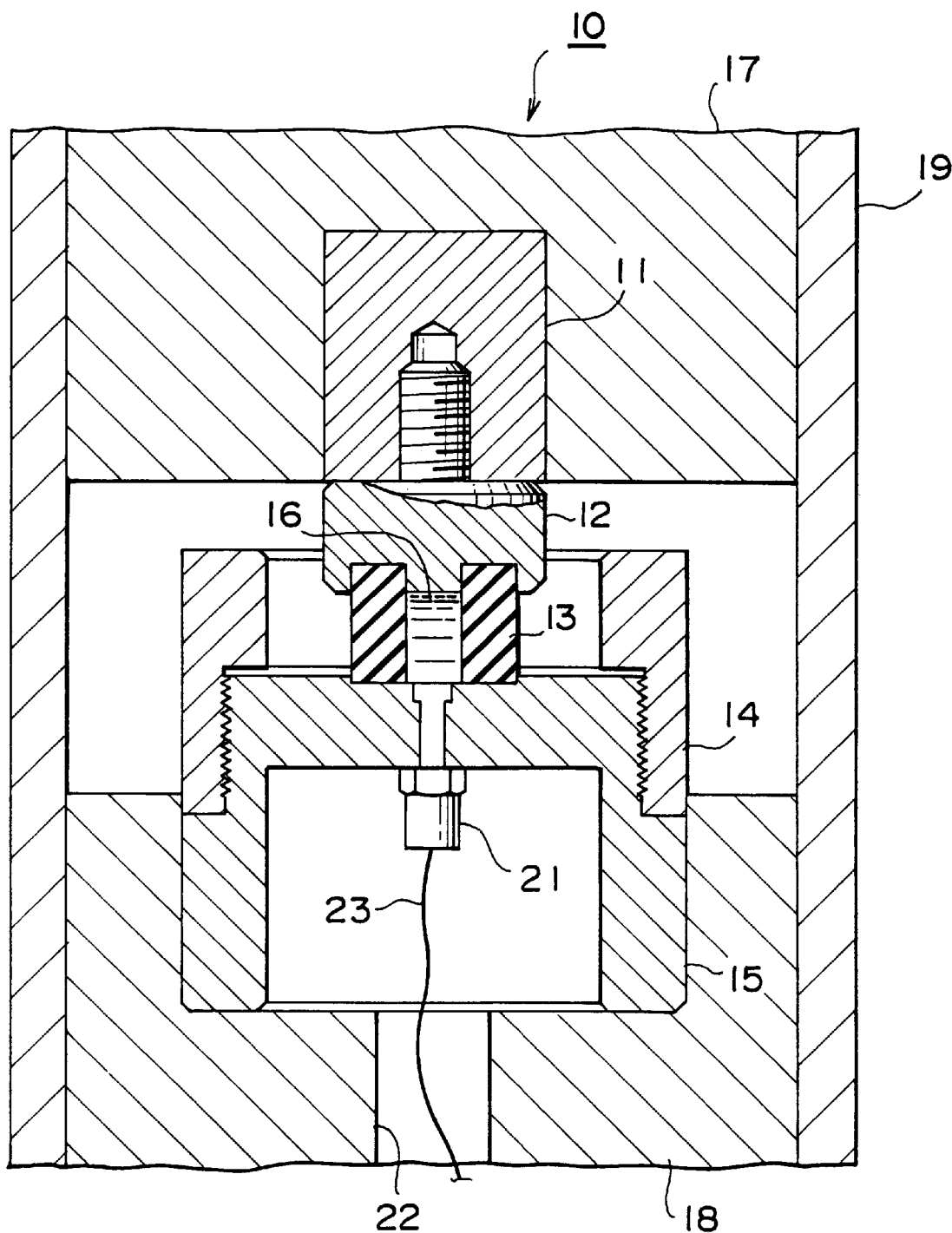
FIG. 1 is a vertical sectional view of a human lumbar model structure according to an embodiment of this invention.

At first referring to FIG. 1, the human lumbar model structure shown therein comprises lumbar assembly 10 and abdominal/back muscle member 19.

Lumbar assembly 10 comprises an upper lumbar member and a lower lumbar member as models of the fourth and fifth human lumbar vertebrae, respectively, each of which tends to suffer from herniation of an intervertebral disk. In the illustrated example, each of the fourth and fifth lumbar members comprises two separate members for convenience of fabrication.

Specifically, the lumbar assembly 10 comprises an upper fourth lumbar member 11, a lower fourth lumbar member 12, an annulus fibrosus member 13, an upper fifth lumbar member 14, and a lower fifth lumbar member 15, each of which has a cylindrical shape. These members are assembled along a common center axis coincident with the gravitational direction and superposed from the top to the bottom in this order. The annulus fibrosus member 13 has an inner cavity filled with a fluid as a nucleus pulposus member 16, i.e., an artificial nucleus pulposus.

The lumbar assembly 10 further comprises an upper body member 17 and a lower body member 18 at the top and the bottom of the above-mentioned lumbar members, respectively. The upper and the lower body members 17 and 18 are surrounded and tightened by the abdominal/back muscle member 19 having elasticity with the above-mentioned lumbar members fixed between the upper and the lower body members 17 and 18. Thus, the similarity between the human lumbar model structure and an actual human body is achieved.

Next, referring to FIG. 2 along with FIG. 1, description will be made of the upper and the lower fourth lumbar members 11 and 12 as the upper lumbar member.

The upper fourth lumbar member 11 has a threaded hole 31 extending from the center of its bottom surface upward in an axial direction. The lower fourth lumbar member 12 has a threaded portion 32 protruding upward from the center of its top surface. The threaded portion 32 is screwed into the threaded hole 31 to fasten the upper and the lower fourth lumbar members 11 and 12. The lower fourth lumbar member 12 is provided with an annular groove 33 formed on its bottom surface to be coupled with the annulus fibrosus member 13.

By way of example, the upper fourth lumbar member 11 has a cylindrical shape with a height of about 50 mm and an outer diameter of about 33 mm. The lower fourth lumbar member 12 has a cylindrical shape with a height of about 20 mm and an outer diameter of about 32 mm which is substantially similar to that of the upper fourth lumbar member 11. The threaded portion 32 has a height of about 25 mm. The annular groove 33 has a depth of about 4 mm and a width such that the annulus fibrosus member 13, illustrated in FIGS. 3A and 3B, fits therein.

The annulus fibrosus member 13, illustrated in FIGS. 3A and 3B, is made of an elastic material and has a flexible structure. When the fourth and fifth lumbar members as the upper and lower lumbar members are inclined with respect to each other, the annulus fibrosus member 13 is bent in a manner similar to the human body. This results in variation of the pressure of the fluid inside the nucleus pulposus member 16. The pressure variation is detected by the pressure sensor 21 illustrated in FIG. 1.

For example, the annulus fibrosus member 13 has an outer diameter of about 24 mm, a thickness of about 15 mm, and a height of about 20 mm. The inner cavity of the annulus fibrosus member 13 has an inner diameter of about 9 mm and is filled with silicone grease as the nucleus pulposus member 16.

The annulus fibrosus member 13 is made of graphite-containing natural rubber having a rubber hardness of about 60 degrees, so that the pressure variation of the silicone grease as the artificial nucleus pulposus occurs in response to external stress in a manner similar to the human body. In order to improve the dimensional accuracy, the annulus fibrosus member 13 is fabricated by a drawing process.

In the foregoing, silicone grease is used as the nucleus pulposus member 16. However, use may be made of other types of fluid such as a liquid or a gas. The annulus fibrosus member 13 is not limited to natural rubber, but may be made of any other appropriate elastic material such as an artificial rubber as long as the external stress is regularly translated into the pressure variation of the fluid filling the inner cavity. In the foregoing, the annulus fibrosus member 13 is fabricated by the drawing process in order to improve the dimensional accuracy. However, any other appropriate process may be aused as long as the above-mentioned function is achieved.

Figure 4:
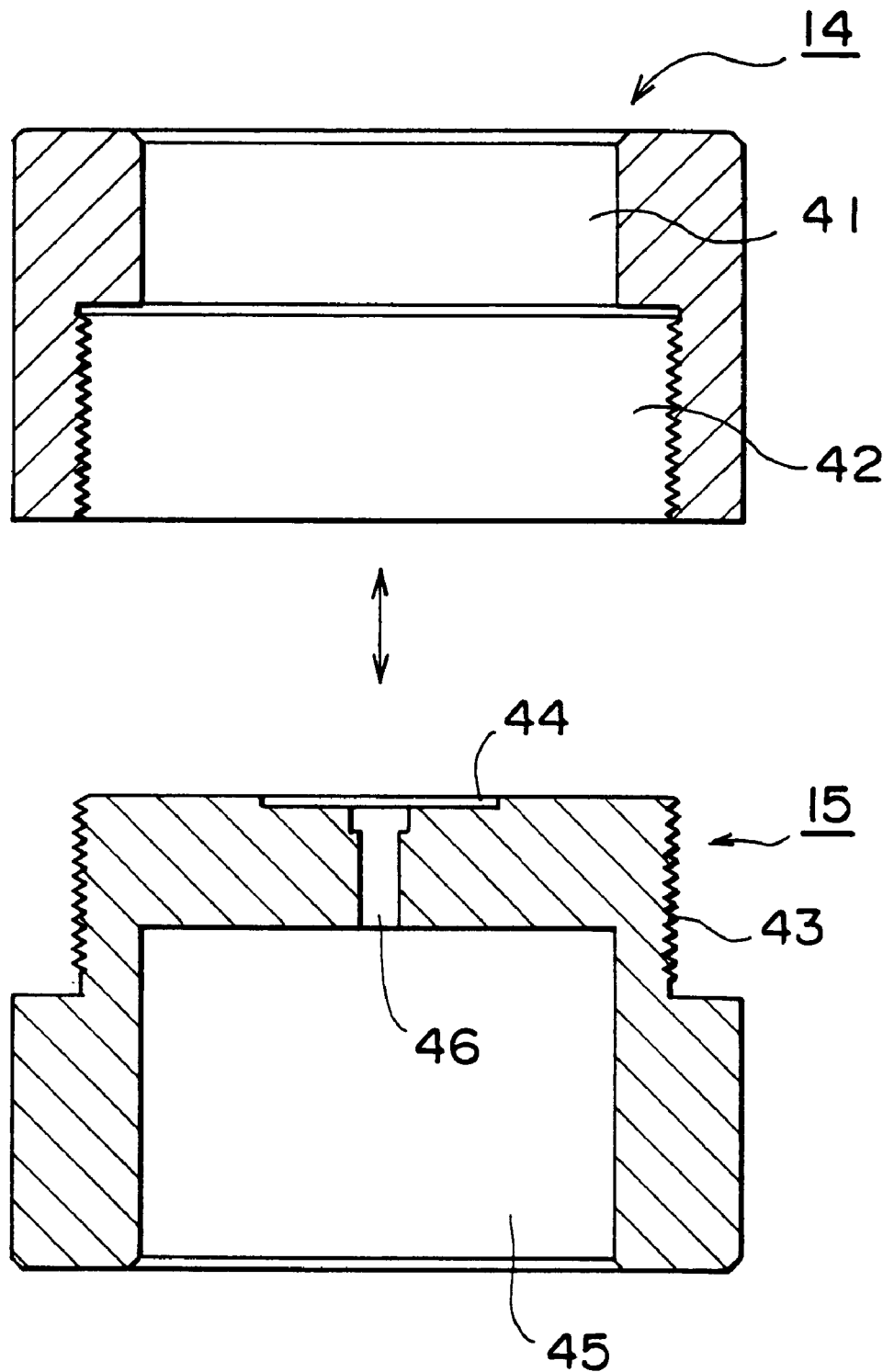
FIG. 4 is an exploded vertical sectional view of the lower lumbar member illustrated in FIG. 1.
Figure 5A:
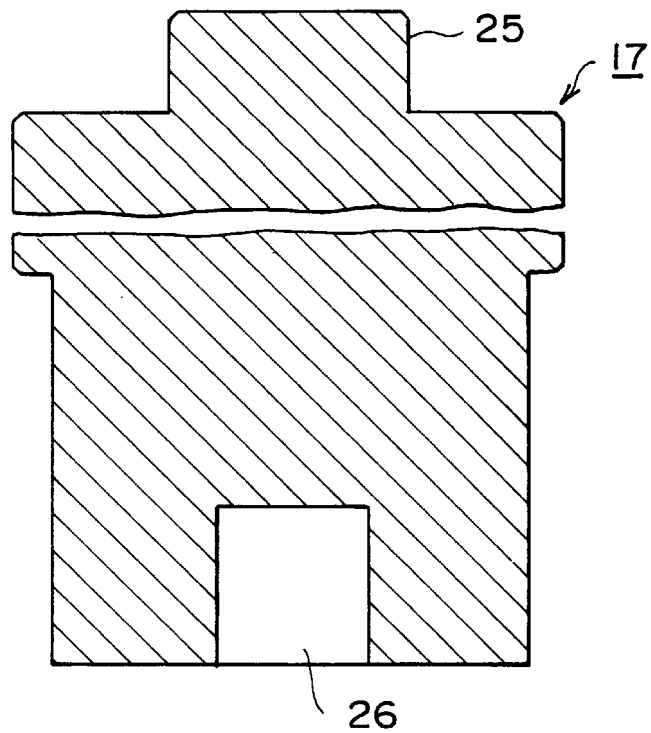
FIG. 5A is a vertical sectional view of the upper body member illustrated in FIG. 1.
Figure 5B:
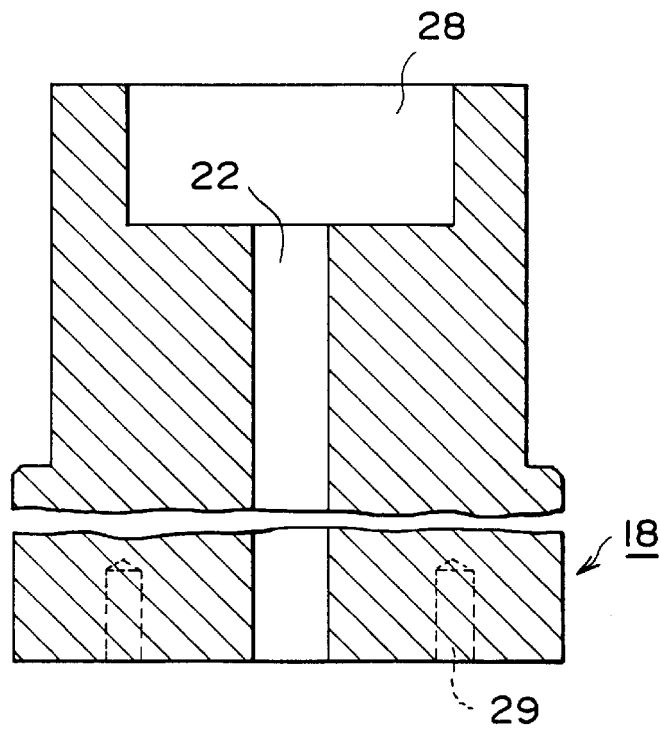
FIG. 5B is a vertical sectional view of the lower body member illustrated in FIG. 1.

Next, referring to FIG. 4 along with FIG. 1, description will be made of the upper and lower fifth lumbar members 14 and 15 as the lower lumbar member.

The upper fifth lumbar member 14 has an annulus fibrosus space 41 formed at its upper part to receive the bottom of the annulus fibrosus member 13, and a fifth lumbar coupling hole 42 formed at its lower part to engage the top of the lower fifth lumbar member 15. The lower fifth lumbar member 15 has an upper part provided with a coupling threaded portion 43 to be screwed into the fifth lumbar coupling hole 42, and a lower part slightly greater in diameter than the upper part. The lower fifth lumbar member 15 has an annulus fibrosus hole 44 formed at the center of its top surface to fit the annulus fibrosus member 13 therein, and a sensor space 45 open at its bottom surface to receive the pressure sensor 21 therein.

The lower fifth lumbar member 15 is further provided with a sensor attaching hole 46 penetrating the upper part thereof along the center axis to connect the annulus fibrosus hole 44 and the sensor space 45. To the sensor attaching hole 46, the pressure sensor 21 (such as a semiconductor pressure transducer) is attached to detect pressure variation as voltage variation proportional to pressure variation.

By way of example, the upper fifth lumbar member 14 has a height or length of about 50 mm and an outer diameter of about 33 mm. The annulus fibrosus space 41 has an inner diameter of about 44 mm and a depth of about 19 mm. The fifth lumbar coupling hole 42, to be engaged with the upper portion or the coupling threaded portion 43 of the lower fifth lumber member 15, has an inner diameter of about 58 mm and a depth of about 22 mm.

On the other hand, the lower fifth lumbar member 15 has a height or a length of approximately 49 mm. The upper part of the lower fifth lumber member 15 has an outer diameter of about 56 mm and a height or a length of about 22 mm while the lower part has an outer diameter of about 70 mm and a remaining height or length of about 27 mm. The annulus fibrosus hole 44 formed on the top surface of the lower fifth lumbar member 15 to fit the annulus fibrosus member 13 (FIGS. 3A and 3B) has an inner diameter of about 24 mm and a depth of about 2 mm. The sensor space 45 open at the bottom surface has an inner diameter of about 46 mm and a depth of about 35 mm.

Referring to FIGS. 5A, 5B, 6, and 7, description will be made in detail about the upper body member 17, the lower body member 18, and the abdominal/back muscle member 19 which form an artificial lumbar peripheral structure, as well as a human robot.

Figure 7:
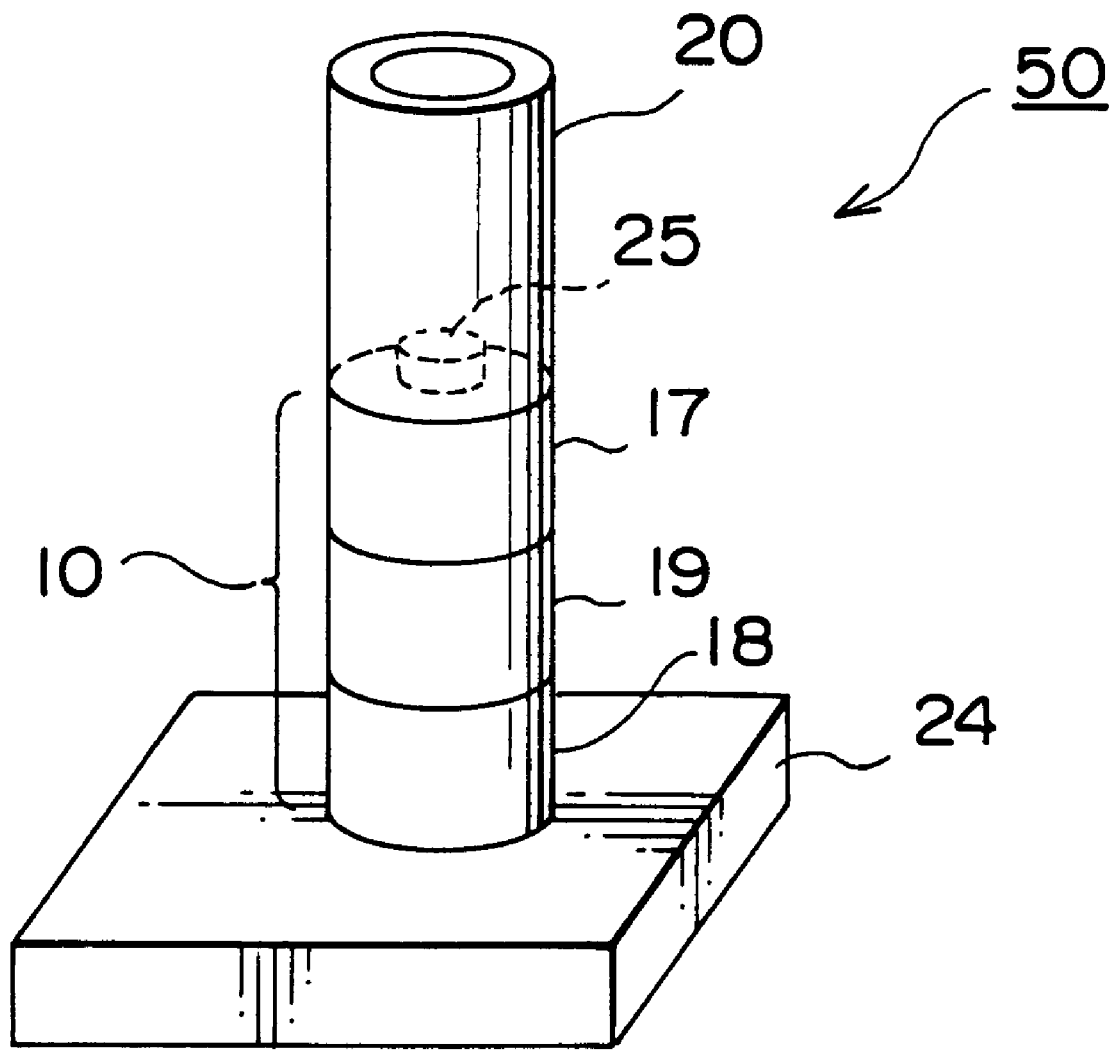
FIG. 7 is a perspective view of a human robot comprising the human lumbar model structure illustrated in FIG. 1 in an application device according to an embodiment of this invention.
Figure 8:
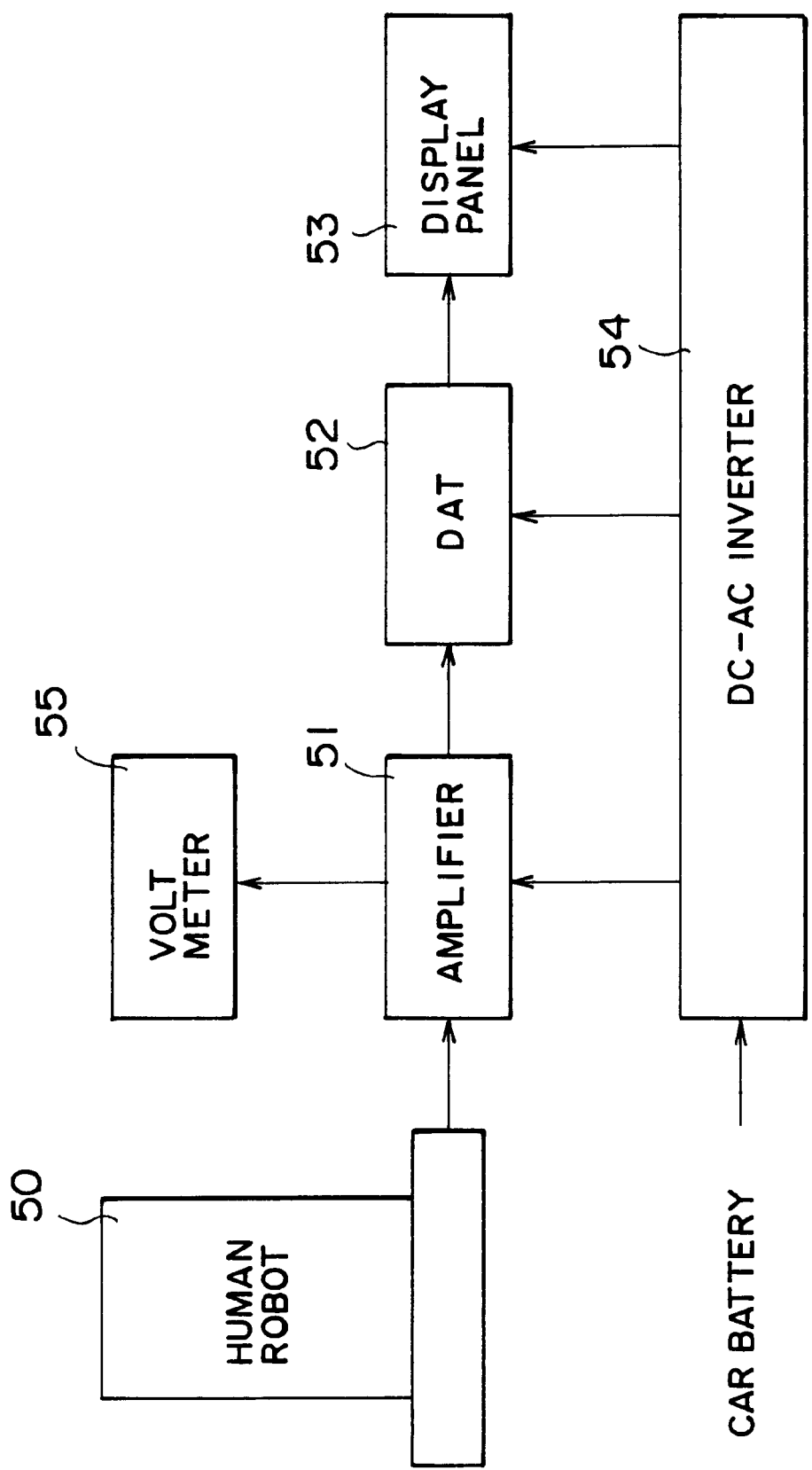
FIG. 8 is a block diagram of the application device comprising the human robot illustrated in FIG. 7.

In FIG. 7, a human robot 50 comprises the above-mentioned human lumbar model structure, a base 24 supporting the human lumbar model structure, and a loading member 20 modeling the upper half of a human body. Specifically, the lower body member 18 modeling a human lumbar bone and its periphery is fixed on the base 24. The upper body member 17 modeling a human abdomen and its periphery is coupled to the lower body member 18 by the above-mentioned lumbar portion. A combination of the upper and lower body members 17 and 18 is surrounded and tightened by the abdominal/back muscle member 19. The loading member 20 is arranged on the top surface of the upper body member 17.

With the above-mentioned structure, when the base 24 vibrates in any direction, the upper body member 17 of the human robot 50 performs a swinging motion due to the elasticity of the abdominal/back muscle member 19 so that the pressure variation occurs in the lumbar portion inside. The human robot 50 is formed so that the pressure variation will have the same level irrespective of the direction along which the variation in motion takes place as long as the variation in motion is caused by an external force of the same level.

Referring to FIGS. 1, 5A, 6, and 7 in combination, the upper body member 17 has a cylindrical body with an outer diameter of about 120 mm and a height or length of about 155 mm. The upper body member 17 is provided with a coupling protrusion 25 formed on its top surface to be coupled with the loading member 20, and a coupling hole 26 open at its bottom surface to receive the upper fourth lumbar member 11. The coupling protrusion 25 has an outer diameter of about 68 mm and a height or length of about 25 mm. The coupling hole 26 has an inner diameter of about 33 mm and a depth of about 35 mm. Over the height of about 80 mm from the bottom surface, the upper body member 17 has a narrowed portion having a smaller outer diameter of about 100 mm to receive the abdominal/back muscle member 19 on its cylindrical outer surface.

Referring to FIGS. 1, 5B, 6, and 7 in combination, the lower body member 18 has a cylindrical body with an outer diameter of about 120 mm and a height or length of about 180 mm. The lower body member 18 is provided with a coupling hole 28 formed on its top surface to receive the lower fifth lumbar member 15, and four threaded holes 29 open at its bottom surface to be engaged with four bolts for securely fastening the lower body member 15 to the base 24. The hole 28 has an inner diameter of about 70 mm and a depth of about 30 mm. Over the height of about 80 mm from the top surface, the lower body member 18 has a narrowed portion having an outer diameter of about 100 mm to receive the abdominal/back muscle member 19 on its cylindrical outer surface.

Figure 6:
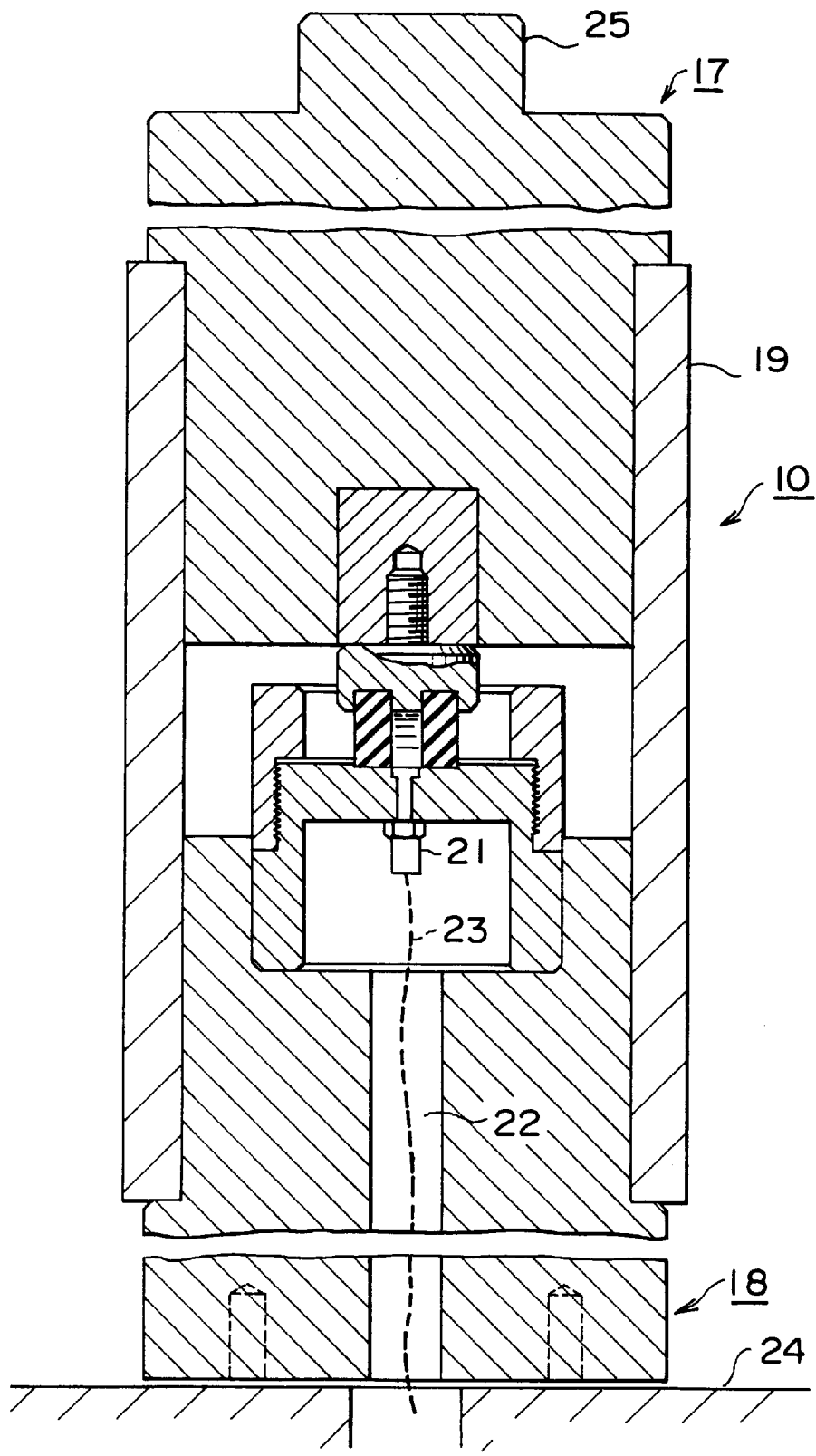
FIG. 6 is a vertical sectional view of the human lumbar model structure for showing the abdominal/back muscle member illustrated in FIG. 1.

Referring to FIGS. 1, 6, and 7, the abdominal/back muscle member 19 can simulate the inclination of the human body following the movement of the base 24 and the recovery into a vertical standing position as an initial position. Therefore, the material, the thickness, the size, and the fixation should be selected taking into account repeatability as a key factor. Specifically, the abdominal/back muscle member 19 is made of an elastic material and adopts "multidirectional" fixation. The "multidirectional" fixation is a fixation such that, when an external force is applied to the base 24 in any direction, if the external force has the same magnitude, the inclination of the upper body member 17 is constant. Therefore, the pressure variation occurring in the fluid as the nucleus pulposus member 16 is also constant.

For example, the abdominal/back muscle member 19 comprises a layered structure of two rubber cushion sheets each of which is made of graphite-containing natural rubber and has a thickness of 5 mm. The abdominal/back muscle member 19 has an annular cylindrical shape with an outer diameter of about 120 mm, an inner diameter of about 100 mm, and a length of about 210 mm. It is noted here that the abdominal/back muscle member 19 need not have the above-mentioned layered structure of the two rubber sheets. Furthermore, the size and material of the abdominal/back muscle member 19 in this invention are not limited to those specified in this paragraph.

As described above, in the human robot 50, the upper body member 17 is inclined from the vertical standing position in response to movement or vibration of the base 24. In this event, pressure variation occurs in the fluid as the artificial nucleus pulposus, i.e., the nucleus pulposus member 16 in the lumbar assembly. The pressure variation is time-sequentially detected by the pressure sensor 21 and recorded as time-varying data. In the lumbar assembly 10 of the above-mentioned structure, the pressure variation appearing in the artificial nucleus pulposus is equivalent to that caused in the lumbar area of the human body.

In the foregoing description, the human robot 50 is placed on the base 24 in the vertical standing position with its center axis coincident with the gravitational direction. However, the human robot 50 may be fixed on the base 24 in an inclined position corresponding to the inclination angle of a passenger seat, for example, an inclination angle of 30° with respect to the gravitational direction. By changing the positioning of the human robot 50 as desired, it is possible to obtain the time-varying data under various other conditions.

Next referring to FIGS. 1 to 7, the process of assembling the human robot 50 (FIG. 7) will be described step by step.

First, the lower body member 18 is fixed on the base 24 by four bolts. Next, the pressure sensor 21 is inserted into the sensor hole 46 of the lower fifth lumbar member 15 so that the detection surface of the pressure sensor 21 is flush with the bottom of the annulus fibrosus hole 44. The upper fifth lumbar member 14 is screwed into the lower fifth lumbar member 15 to form the lower lumbar member.

Next, the lower fifth lumbar member 15 is fitted and fixed to the lower body member 18 with a sensor cord 23 led out from the pressure sensor 21 through a sensor cord channel 22. Subsequently, the annulus fibrosus member 13 is fitted into the annulus fibrosus hole 44 of the lower fifth lumbar member 15 and fixed in any appropriate manner, for example, by the use of an adhesive. Thereafter, silicone grease as the artificial nucleus pulposus, i.e., the nucleus pulposus member 16 is fed from the above into the inner cavity of the annulus fibrosus member 13.

Then, the threaded portion 32 of the lower fourth lumbar member 12 is screwed into and fastened to the upper fourth lumbar member 11 to form the upper lumbar member. Thereafter, the upper part of the annulus fibrosus member 13 with its lower part fitted into the lower lumbar member is inserted into the annulus fibrosus groove 33 of the lower fourth lumbar member 12 and fixed in any appropriate manner, for example, by the use of an adhesive. Through the above-mentioned steps, the upper lumbar member is arranged at the topmost level.

Thereafter, the abdominal/back muscle member 19 (i.e., a cylindrical natural rubber ring) is tightly fitted around the narrowed portion at the upper part of the lower body member 18. Next, the upper fourth lumbar member 11 is fitted into the coupling hole 26 of the upper body member 17. At the same time, the abdominal/back muscle member 19 is tightly fitted around the narrowed portion at the lower part of the upper body member 17. Then, the loading member 20 is fitted to the coupling protrusion 25 of the upper body member 17 at the top of the assembly. In this manner, the human robot 50 is completed.

Next, referring to FIGS. 1, 6, 7, and 8, description will be made of the measurement of the ride vibration comfort of a moving motor vehicle.

The pressure sensor 21 in the human robot 50 detects, as the voltage variation, the pressure variation occurring in silicone grease as the nucleus pulposus member 16, i.e., the artificial nucleus pulposus as a result of distortion of the annulus fibrosus member 13. Through the sensor cord 23, the pressure sensor 21 supplies an amplifier 51 with an electric signal representing voltage variation corresponding to the pressure variation.

The pressure sensor 21 comprises a small semiconductor pressure transducer. The time variation of the pressure applied to the artificial nucleus pulposus between the lumbar members is recorded on a DAT (Digital Audio Tape) 52. The recorded data are displayed on a display unit 53 such as an oscilloscope and/or printed by a printer.

Figure 9A:
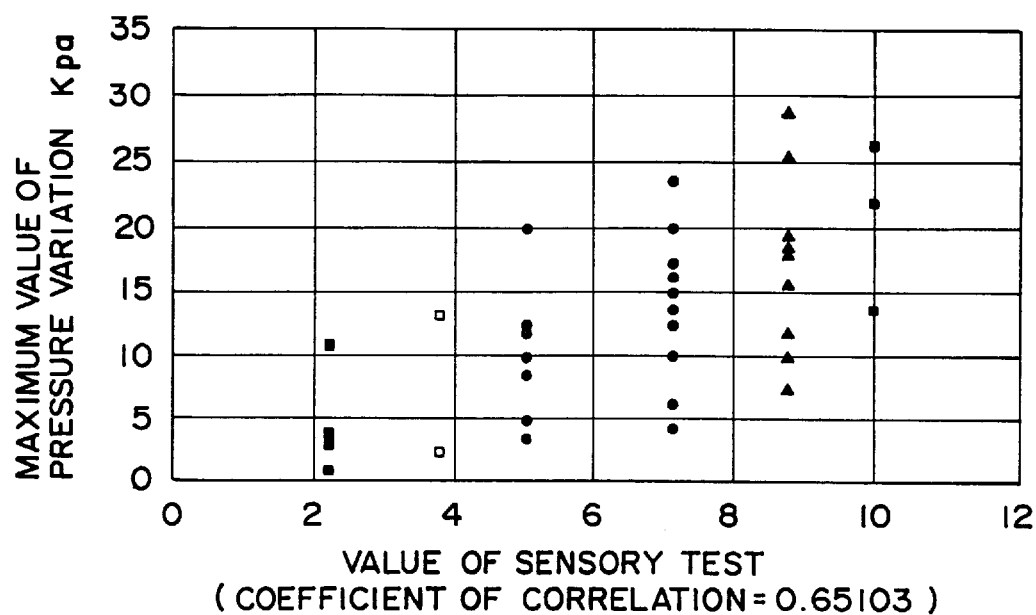
FIGS. 9A and 9B are graphs representing the correlation of sensory test results relative to the peak values and the mean value of pressures caused in the nucleus pulposus member as the artificial nucleus pulposus in the human robot illustrated in FIG. 7 in response to pressure applied thereto.
Figure 9B:
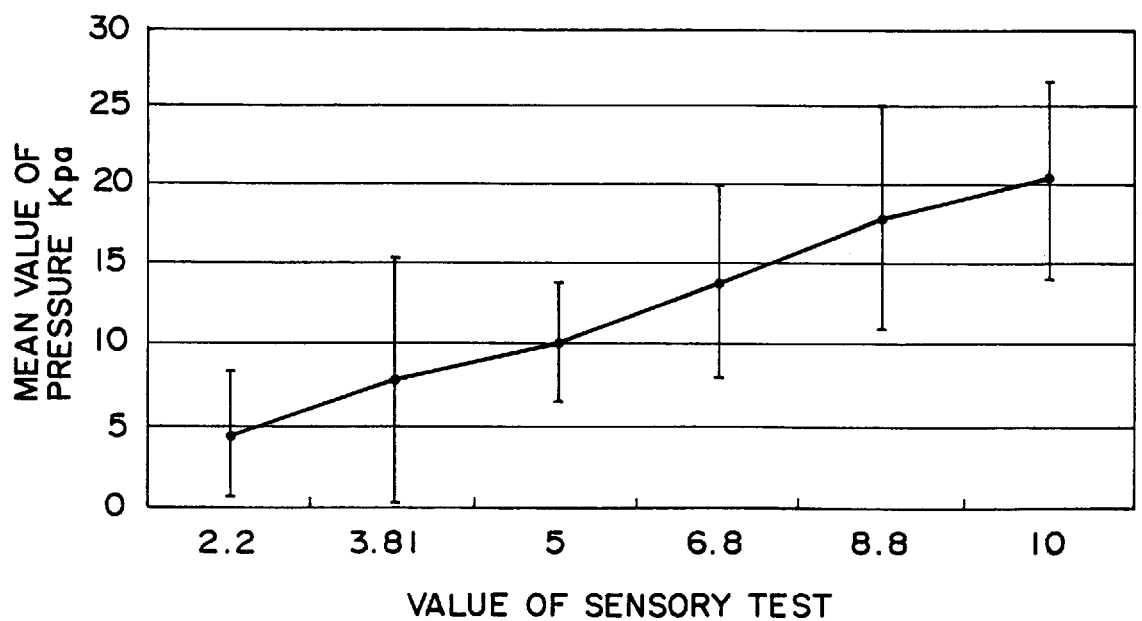

Next, referring to FIGS. 9A and 9B, description will be made of the relationship between sensory test results for human beings and simulation results obtained by the above-mentioned human robot. In FIG. 9A, the simulation results are given by peak values of pressure in the pressure variation caused in silicone grease as the artificial nucleus pulposus, i.e., the nucleus pulposus member, when pressure is applied to the human robot. On the other hand, in FIG. 9B, mean values of pressure are plotted as the simulation results.

As regards the sensory test results illustrated in the figures, the test values 2.2, 3.81, 5, 6.8, 8.8, and 10 correspond to the evaluation of "no problem", "satisfied except noise", "not so bad", "unpleasant", "bad " and "painful", respectively.

For each of the sensory test values, the peak values of pressure in the pressure variation occurring in the artificial nucleus pulposus exhibit the dispersive distribution, as seen from FIG. 9A. However, the mean values of pressure are substantially proportional to the sensory test values, as seen in FIG. 9B.

Figure 10A:
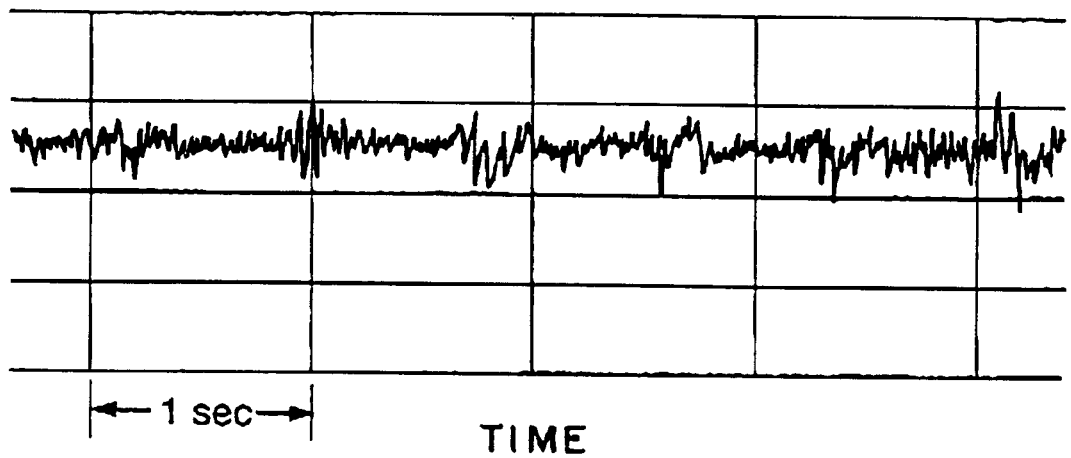
FIGS. 10A and 10B show waveprofiles representing ride vibration comfort experimentally measured by the application equipment illustrated in FIG. 8 carried on cars A and B, respectively.
Figure 10B:
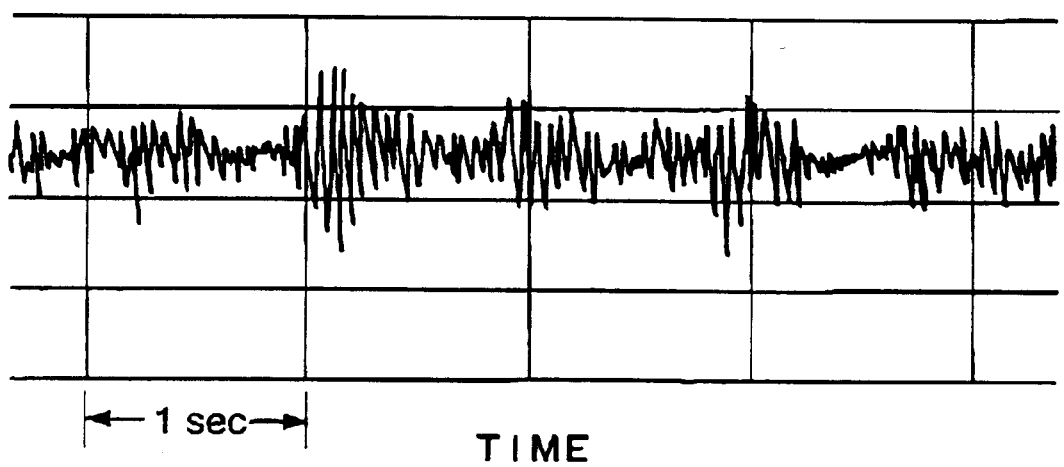

Referring to FIGS. 10A and 10B, the ride vibration comfort test was performed to obtain the waveforms illustrated in the figures. In the test, the human robot was placed in the passenger seat in each of two automobiles A and B. Each of the automobiles A and B was driven at a constant speed of about 105 km/h. During the ride, the nucleus pulposus member between the lumbar members was subjected to vibration. In FIGS. 10A and 10B, the waveprofiles obtained from the automobiles A and B are shown for four seconds, respectively.

As seen in FIG. 10A, automobile A exhibits small variation in the peak values of pressure and is judged good for human beings having a herniated intervertebral disk. On the other hand, the automobile B exhibits large variation in peak values of pressure and gives a great shock. Thus, the automobile B is judged inferior to the automobile A in ride vibration comfort.

In the foregoing, the human body model and the human lumbar model structure have been described with the particular shapes and specific sizes in correspondence to the human body. However, even if the total size is reduced, appropriate measurement data can be obtained by adjusting and selecting the sizes and materials of the annulus fibrosus member, the abdominal/back muscle member, and the nucleus pulposus member and by modifying the method of detecting the pressure variation in the nucleus pulposus member, as will readily be understood.

In the foregoing description, the pressure sensor is brought into contact with the fluid of the nucleus pulposus member at the bottom of the inner cavity of the annulus fibrosus member. However, the pressure sensor may be placed at any appropriate position as long as direct contact with the fluid is assured.

While this invention has been described in conjunction with the specific embodiment, the details (such as the shapes, the sizes, and the assembling steps) are intended to help understand and not to restrict this invention. It will readily be understood by those skilled in the art that various modifications can be made within the scope of appended claims.

What is claimed is:

1. A human lumbar model structure for simulating pressure applied to nucleus pulposus in the lumbar spine of a human body, said structure comprising:

a cylindrical lumbar assembly having an upper body member, an upper lumbar member, an annulus fibrosus member, a lower lumbar member, and a lower body member which are coaxially arranged around a common center axis and which are superposed vertically from top to bottom in this order; and an abdominal/back muscle member made of an elastic material and having a hollow cylindrical shape, said abdominal/back muscle surrounding and tightening said lumbar assembly over a center area approximately half the height of said upper and lower body members;

said upper lumbar member being tightly fitted into said upper body member;

said lower lumbar member being tightly fitted into said lower body member;

said annulus fibrosus member comprising a thick cylindrical ring made of a hard elastic material, said annulus fibrosus member having upper and lower parts fitted into said upper and lower lumbar members, respectively, and an inner cavity filled with a fluid as a nucleus pulposus member.

2. A human lumbar model structure as claimed in claim 1, wherein said annulus fibrosus member is made of graphite-containing natural rubber having a rubber hardness approximately equal to 60 degrees and is produced by a drawing process, said annulus fibrosus member having a height of about 20 mm, an outer diameter of about 24 mm, and an inner diameter of about 9 mm.

3. A human lumbar model structure as claimed in claim 1, wherein said fluid as said nucleus pulposus member is silicone grease.

4. A human lumbar model structure as claimed in claim 1, wherein said abdominal/back muscle member of an annular cylindrical shape comprises a layered structure of two natural rubber sheets each of which is about 5 mm thick and has an outer diameter of about 120 mm, an inner diameter of about 100 mm, and a length of about 210 mm.

5. A human lumbar model structure as claimed in claim 1, further comprising a pressure sensor arranged along a center axis of said lower lumbar member in direct contact with said nucleus pulposus member for detecting a pressure variation of said nucleus pulposus member as a voltage variation linearly proportional to the pressure variation to produce an electric signal representative of the voltage variation.

6. An application equipment utilizing a human lumbar model structure claimed in claim 5 to simulate a pressure applied to the nucleus pulposus in the lumbar spine of a human body, said application equipment comprising:

a human robot comprising said human lumbar model structure fixedly and stably mounted on an upper surface of a base, and a loading member arranged on said human lumbar model structure so that said human robot has a weight equivalent to that of the human body; and a recording unit connected to said pressure sensor for time-sequentially recording a measurement result given by the voltage variation detected by said pressure sensor and representative of the pressure variation, the vibration given to said human robot being recorded as a waveform representing the pressure variation occurring in said nucleus pulposus member.

7. An application equipment as claimed in claim 6, wherein said human robot is securely mounted on the upper surface of said base with its center axis coincident with the gravitational direction or the inclination of the seat back of a passenger seat.

* * * * *